(12) United States Patent
Kayyali

(10) Patent No.: US 11,111,023 B2
(45) Date of Patent: Sep. 7, 2021

(54) RECLINING CHAIR WITH REAR IMPINGEMENT PREVENTION

(71) Applicant: Rami Kayyali, Los Angeles, CA (US)

(72) Inventor: Rami Kayyali, Los Angeles, CA (US)

(*) Notice: Subject to any disclaimer, the term of this patent is extended or adjusted under 35 U.S.C. 154(b) by 326 days.

(21) Appl. No.: 16/017,944

(22) Filed: Jun. 25, 2018

(65) Prior Publication Data
US 2019/0389582 A1 Dec. 26, 2019

(51) Int. Cl.
B64D 11/06 (2006.01)

(52) U.S. Cl.
CPC ........ B64D 11/064 (2014.12); B64D 11/0643 (2014.12)

(58) Field of Classification Search
CPC .............. B64D 11/064; B64D 11/0643; B64D 11/0648; B60N 2/00
See application file for complete search history.

(56) References Cited

U.S. PATENT DOCUMENTS

| | | | |
|---|---|---|---|
| 3,744,843 A * | 7/1973 | Barecki | B60N 2/3013 297/316 |
| 5,280,999 A | 1/1994 | Jones et al. | |
| 5,320,308 A * | 6/1994 | Bilezikjian | B64D 11/064 244/122 R |
| 5,320,411 A * | 6/1994 | Sera | A47C 11/005 297/331 |
| 5,765,913 A | 6/1998 | LaPointe | |
| 6,145,929 A | 11/2000 | Gollahon | |
| 7,585,018 B2 | 9/2009 | LaPointe | |
| 7,726,607 B2 * | 6/2010 | Schumacher | B60N 2/22 244/122 R |
| 8,727,433 B2 | 5/2014 | Lawson | |
| 9,193,281 B2 | 11/2015 | Elton | |
| 9,616,784 B2 * | 4/2017 | Nagayasu | B60N 2/995 |
| 2005/0275266 A1 | 12/2005 | Gevaert et al. | |
| 2007/0158980 A1 | 7/2007 | LaPointe | |
| 2008/0258531 A1 | 10/2008 | Lu | |
| 2009/0242700 A1 * | 10/2009 | Raymond | B60N 2/23 244/118.6 |
| 2011/0304193 A1 | 12/2011 | Murphy et al. | |
| 2012/0217779 A1 * | 8/2012 | Gaither | B60N 2/02 297/316 |
| 2014/0097648 A1 | 4/2014 | Voyce | |
| 2014/0300145 A1 * | 10/2014 | Beroth | B60N 2/231 297/83 |
| 2015/0203205 A1 * | 7/2015 | Thompson | B64D 11/064 297/344.1 |
| 2016/0159253 A1 * | 6/2016 | Frasher | B60N 2/22 296/65.01 |
| 2017/0015423 A1 * | 1/2017 | Udriste | B60N 2/34 |
| 2018/0281648 A1 * | 10/2018 | Darbyshire | A47C 7/462 |

* cited by examiner

*Primary Examiner* — Brian M O'Hara
*Assistant Examiner* — Keith L Dixon
(74) *Attorney, Agent, or Firm* — Law Office of Scott C Harris, Inc

(57) ABSTRACT

A reclining seat system, that has an upright seat that is fixed, and a movable reclining seat, which connects to and moves relative to the upright seat, between an upright position where the movable reclining seat portion is in the same shape of an upright position as the fixed upright seat, and between a reclined position where the movable reclining seat portion is in a position of reclining, while the upright portion remains upright to avoid impinging on the space behind the upright seat.

15 Claims, 1 Drawing Sheet

RECLINING CHAIR WITH REAR IMPINGEMENT PREVENTION

BACKGROUND

Reclining chairs are known as chairs that allow the user to lean the back of the seat in a backwards direction. A reclined chair is often more comfortable for the user to sit on. However in some environments, like on an airplane, reclining the back rest of the chair backwards can encroach on the space of the person behind.

SUMMARY

An embodiment is described herein which enables a seat part of a seat to be moved, and reclined, while the main part of the seat stays upright, thus avoiding the reclining in the seat from impinging on the space of the person behind.

DETAILED DESCRIPTION

The inventor recognized that in certain environments, there is underutilized in the vertical or "y" direction that can be used to allow reclining a seat without moving the back of the seat in the horizontal or "x" direction. An advantage of this system is that the chair can be reclined without encroaching on the horizontal space of the passenger behind the reclining chair, at the time when the chair is reclined.

Figure 1:
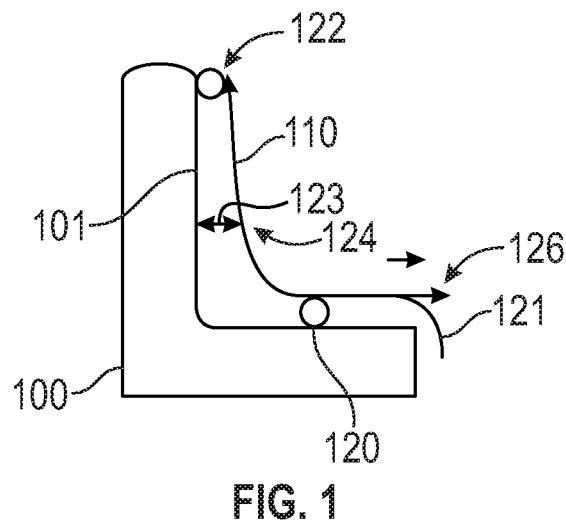
FIG. 1 shows an embodiment of a reclining seat in the reclined position.
Figure 2:
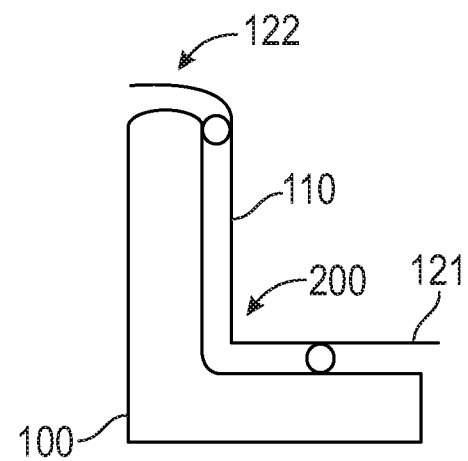
FIG. 2 shows an embodiment showing the reclined seat in the full upright and non-reclined position.

The basic system is shown in FIGS. 1 and 2. The chair base 100 is a fixed chair system, that is fixed in the upright position. This chair part 100 is completely fixed, and cannot be moved.

A movable swing part 110 moves relative to the chair base 100. The swing part 110 may be, for example formed of separated wooden slats or elatomeric or fabric covered foam slats that are connected to one another and hence hinged to one another. The swing part 110 attaches to an attachment parts 120 and 122 which enables the swing part 110 to move relative to the chair 100. When the swing part moves in the reclining direction, shown by the arrow 126, this causes the top part 122 to move lower, and causes a reclined position by lengthening of the space 123 between the back portion 124 of the swing part 110, and the corresponding back portion 101 of the fixed chair 100. This is the reclined position. In embodiments, the reclined position can be to 15 degrees or 30 degrees or some other reclined amount.

FIG. 2 illustrates the non-reclined, upright position, of the chair. In moving the swing part 110 between reclined and upright, the main seat 100 stays in position, while the movable swing part 110 moves relative to the chair 100 to keep the user upright, with the back portion 200 of the swing part 110 being as close as possible to the upright seat 100. This pulls in the front portion 121 of the swing part, and pushes upward the rear portion 122 of the seat part. Because the movable seat part is formed of flexible material, this may cause the movable seat part 122 that extends from where it is supported by the seat to fold down toward the top of the seat 100, rather than sticking out.

Figure 3:
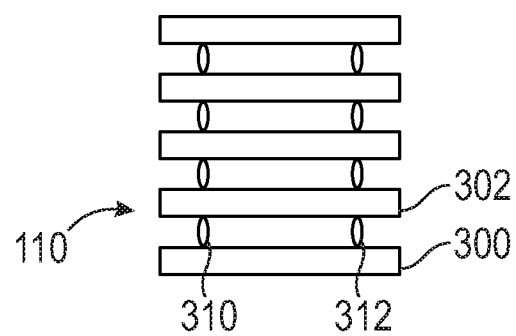
FIG. 3 shows an exemplary material of the seat for movable seat part.

FIG. 3 illustrates the material swing part of the seat 110, formed of a material which has spaced apart slats such as 300, 302 which are each pivotable in direction relative to one another. The slats such as 300 and 302 are connected by nylon connectors 310, 312, such that each two adjacent slats stays together to one another, but can bend one relative to the other.

Other materials can also be used. The slats can be slats of bamboo, or can be made of an elastomeric material such as rubber, or a hard foam material to make them more comfortable. The swing part 110 can be of a single piece material that is flexible to enable it to move between the positions in FIGS. 1-2.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A reclining seat system, comprising: a fixed upright seat portion which is fixed in an upright position, having a vertical back portion and a horizontal sitting portion; and a movable seat portion, which connects to and moves relative to the fixed upright seat portion, where the movable seat portion is an elongated flat portion, a first attachment part, attached to the fixed upright seat portion, the first attachment part slidably holding the movable seat portion at a top portion of the vertical back portion, and allows the movable seat portion to slide in a direction parallel to the vertical back portion;

a second attachment part, attached to the horizontal sitting portion, the second attachment part slidably holding the movable seat portion at a front portion of the horizontal sitting portion, and allows the movable seat portion to slide in a direction parallel to the horizontal sitting portion, and perpendicular to the direction of the vertical back portion;

where the first and second attachment parts configure the movable seat portion to slide between a) an upright position where the movable seat portion is upright, and where in the upright position, a back portion of the movable seat portion is parallel to the vertical back portion of the fixed upright seat portion, and between b0 a reclined position where the movable seat portion is in a position of reclining, where in the reclined position, a space between the back portion of the movable seat portion and the back portion of the fixed upright seat portion is lengthened, and the fixed upright seat portion remains upright and where a space between a lower portion of the back portion of the movable seat portion and the lower portion of the fixed upright seat portion, is greater than a space between an upper portion of the back portion of the movable seat portion and an upper portion of the fixed upright seat portion.

2. The seat system as in claim 1, wherein the movable seat portion slides between the upright position and the reclined position, and extends an end portion of the movable seat portion over a front edge of the horizontal sitting portion when in the upright position, and retracts that end portion of the movable seat portion when in the reclined position.

3. The seat system as in claim 1, wherein the movable seat portion reclines to a reclining position where it is inclined by 15°.

4. The seat system as in claim 1, wherein the movable seat portion is formed of at least five flat slats, each of identical size and shape, each slat connected together with connecting portions between the slats and spaces between the slats, where each two adjacent slats are connected to be bendable relative to one another in any different direction.

5. The seat system as in claim 4, wherein the slats are made of elastomeric material.

6. The seat system as in claim 5, wherein the elastomeric material is covered with a fabric.

7. The seat system as in claim 4, wherein in a fully upright position, an extending part of the movable seat portion folds at least at the first attachment part to press against a top most portion of the upright seat, and in a fully reclined position, a part of the movable seat portion slides to cover a top of the vertical back portion of the upright seat.

8. The seat system as in claim 1, further comprising a first attachment part attached to the vertical back portion of the upright seat portion, and a second attachment part attached to the horizontal sitting portion of the upright seat portion, and where the movable seat portion rolls relative to the upright seat portion in a first direction while held by the first and second attachment portions in order to move to the reclined position, and rolls in a second direction, opposite to the first direction relative to upright seat portion while held by the first and second attachment portions to move to the upright position.

9. A method of reclining relative to a fixed seat, comprising:
   slidably connecting a movable seat portion to a fixed upright seat portion which is fixed in an upright position, the movable seat having a vertical back portion and a horizontal sitting portion;
   the slidably connecting using a first attachment part, attached to the fixed upright seat portion, the first attachment part that slidably holds the movable seat portion at a top portion of the vertical back portion, and a second attachment part, attached to the horizontal sitting portion, the first attachment part that slidably holds the movable seat portion at a front portion of the horizontal sitting portion,
   sliding the movable seat portion relative to the first attachment part, using the first attachment part and the second attachment part holding the movable seat portion and allowing the movable seat portion to move relative to the fixed upright seat portion, where the first attachment part allows the movable seat portion to move in the vertical direction and the second attachment part allows the movable seat portion to move in the horizontal direction;
   the sliding comprising sliding between a) an upright position where the movable seat portion is upright, and where in the upright position, a back portion of the moveable seat portion is parallel to the vertical back portion of the fixed seat portion, and between b) a reclined position where the movable seat portion is in a position of, where in the reclined position, a space between the back portion of the movable seat portion, and the back portion of the fixed upright seat portion is lengthened, and the fixed upright seat portion remains upright and where a space between a lower portion of the back portion of the movable seat portion and the lower portion of the fixed upright seat portion, is greater than a space between an upper portion of the back portion of the movable seat portion and an upper portion of the fixed upright seat portion.

10. The method as in claim 9, wherein the sliding of the movable seat portion is between the upright position and the reclined position, and extends an end portion of the movable seat portion over a front edge of the horizontal sitting portion edge of the seat when in the upright position, and retracts that end portion of the movable seat portion when in the reclined position.

11. The method as in claim 9, wherein the movable seat portion reclines to a position where it is inclined by 15°.

12. The method as in claim 9, wherein the movable seat portion is formed of at least five flat slats, each of the slats of identical size and shape, each slat connected together with connecting portions between the slats, and spaces between the slats, where each two adjacent slats are connected to be bendable relative to one another in any different direction.

13. The method as in claim 12, wherein, wherein the slats are made of elastomeric material.

14. The method as in claim 13, wherein the elastomeric material is covered with a fabric.

15. The method as in claim 9, wherein in a fully upright position, an extending part of the movable seat portion folds at least at one of connecting portions to press against a top most portion of the upright seat, and in a fully reclined position, the extending part of the movable seat portion slides to cover a top of the vertical back portion of the upright seat.

* * * * *